(12) United States Patent
Hayashi et al.

(10) Patent No.: US 7,655,163 B2
(45) Date of Patent: Feb. 2, 2010

(54) MANUFACTURING METHOD OF FILM INSERT MOLDED ARTICLE

(75) Inventors: Seiji Hayashi, Aisai (JP); Kiyomi Matsuoka, Aisai (JP); Yoshihide Goto, Aisai (JP); Eiichiro Goto, Aisai (JP)

(73) Assignee: Sanwa Screen Co., Ltd., Aisa-Shi, Aichi (JP)

( * ) Notice: Subject to any disclaimer, the term of this patent is extended or adjusted under 35 U.S.C. 154(b) by 0 days.

(21) Appl. No.: 12/081,368

(22) Filed: Apr. 15, 2008

(65) Prior Publication Data

US 2008/0277823 A1    Nov. 13, 2008

(30) Foreign Application Priority Data

May 9, 2007    (JP)    ............... 2007-124505

(51) Int. Cl.
*B29C 45/14*    (2006.01)

(52) U.S. Cl. .................. 264/132; 264/135; 264/153; 264/154; 264/267; 264/275; 264/296; 264/294

(58) Field of Classification Search ............... None
See application file for complete search history.

(56) References Cited

U.S. PATENT DOCUMENTS

| | | | | |
|---|---|---|---|---|
| 4,797,244 | A | * | 1/1989 | Sauer ............... 264/266 |
| 5,599,608 | A | * | 2/1997 | Yamamoto et al. ........ 428/192 |
| 5,746,962 | A | * | 5/1998 | Yamamoto ............... 264/266 |
| 5,759,477 | A | * | 6/1998 | Yamamoto ............... 264/513 |
| 5,985,198 | A | * | 11/1999 | Harris et al. .............. 264/255 |
| 6,001,292 | A | * | 12/1999 | Atake ..................... 264/135 |

FOREIGN PATENT DOCUMENTS

| | | |
|---|---|---|
| JP | 63-34814 A | 2/1988 |
| JP | 63-59508 B2 | 3/1988 |
| JP | 2000-25103 A | 1/2000 |
| JP | 2000-84975 A | 3/2000 |
| JP | 2000-344910 A | 12/2000 |

* cited by examiner

*Primary Examiner*—Edmund H. Lee
(74) *Attorney, Agent, or Firm*—Birch, Stewart, Kolasch & Birch, LLP

(57) ABSTRACT

A manufacturing method of a film insert molded article in which no resin layer is seen in the front and no wrinkle is generated in a film is provided. A thermoformed film (11) for coating is arranged within a cavity (15), and molten resin is injected so that a film insert molded article (50) molded integrally with the film (11) for coating and having a coating plane coated with the film (11) for coating is obtained. A printing ink layer (20) and a binder layer (30) are formed in a raw material film (10). The raw material film (10) is cut out and the film (11) for coating is formed so as to have a size for coating the coating plane and being able to form an outer circumferential bending portion (12) arranged in an outer circumferential side portion (41) by adding a width exceeding a heat shrinking amount of the film. After the film (11) for coating is preheated, the film (11) for coating is thermoformed so that a predetermined three-dimensional shape (13) and the outer circumferential bending portion (12) are formed. The film (11) for coating in which the three-dimensional shape (13) and the outer circumferential bending portion (12) are formed, is arranged within the cavity (15) such that the binder layer (30) comes into contact with molten resin. The molten resin is then injected.

8 Claims, 4 Drawing Sheets

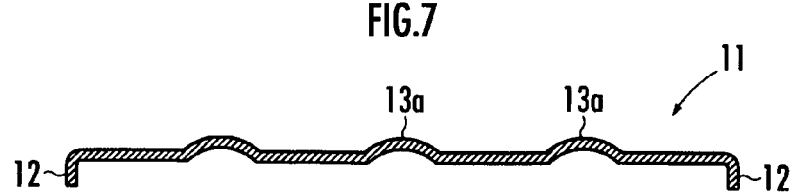
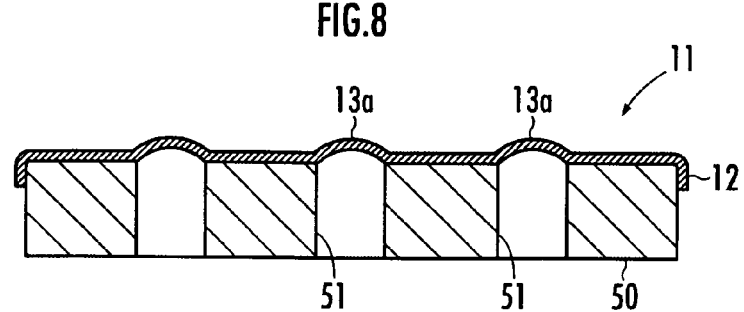
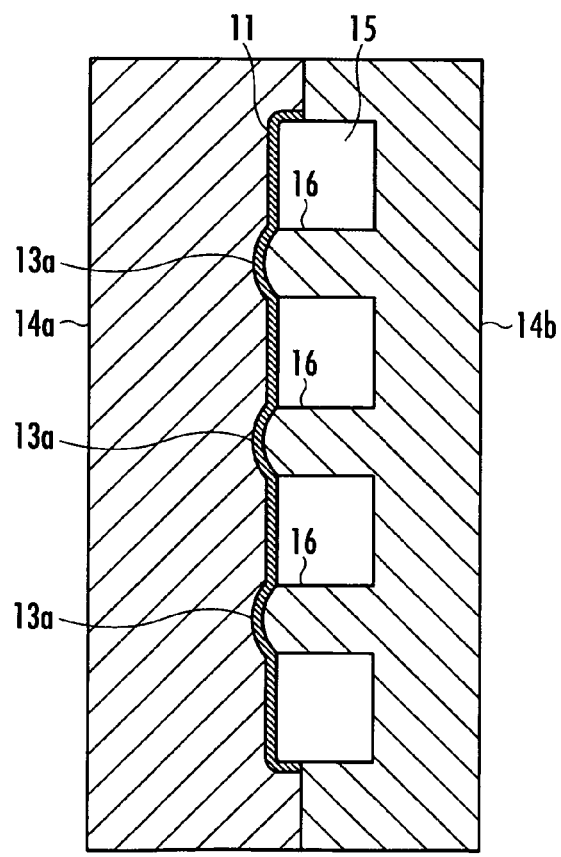

MANUFACTURING METHOD OF FILM INSERT MOLDED ARTICLE

FIELD OF THE INVENTION

The present invention relates to a manufacturing method of a film insert molded article.

BACKGROUND ART

A film insert molded article in which a film printing a pictograph, a mark, a design or the like thereon is molded integrally with an injection-molded article is formerly known as one of decorating techniques of the injection-molded article.

For example, the film insert molded article is manufactured as follows (see Japanese Patent Laid-Open No. 63-34814). Namely, a decorating film having a display section of a keyboard printed on a face of the front side of a synthetic resin film able to be thermoformed is thermoformed in a shape of a surface of a keyboard panel so that a film for coating is made. The film for coating is then arranged within a die, and molten resin is injected from a rear side of the film for coating into the die so that the film insert molded article is manufactured.

In the above former manufacturing method of the film insert molded article, the film is thermally shrunk when the film arranged within the die is thermoformed. A heat shrinking amount due to the thermoforming is increased as a product size is increased. Therefore, in the former manufacturing method of the film insert molded article, the size of the film arranged within the die is determined by predicting the heat shrinking amount in advance.

However, when the product size of the film insert molded article is increased, variation in the heat shrinking amount is also increased. Accordingly, there are disadvantages in that the actual heat shrinking amount becomes larger than the predicted heat shrinking amount, and no entire surface of the keyboard panel can be coated with the film for coating, and a resin layer is seen in the7 front in some cases.

Further, when the actual heat shrinking amount is reversely smaller than the predicted heat shrinking amount, there are disadvantages in that an excessive portion is generated in the film for coating arranged within the die, and a wrinkle is generated in the film when the surface of the film insert molded article is coated.

SUMMARY OF THE INVENTION

An object of the present invention is to provide a manufacturing method of the film insert molded article in which such disadvantages are dissolved and a resin layer is seen in the front and no wrinkle is generated in the film on the surface of the film insert molded article coated with the film even when dispersion is generated in the heat shrinking amount due to the thermoforming of the film.

Therefore, the present invention is characterized in a manufacturing method of a film insert molded article in which a film for coating thermoformed in a predetermined shape in advance is arranged within a cavity of an injection molding die, and molten resin is injected into the cavity and is molded integrally with the film for coating, and the film insert molded article having a coating plane coated with the film for coating is obtained; the manufacturing method comprising a process for performing printing on a raw material film and forming a printing ink layer; a process for forming a binder layer on the printing ink layer; a process for forming the film for coating by cutting out the raw material film into a size for coating the coating plane and being able to form an outer circumferential bending portion arranged in an outer circumferential side portion of the coating plane of the film insert molded article by adding a width exceeding a heat shrinking amount of the film due to the thermoforming; a process for forming a predetermined three-dimensional shape and the outer circumferential bending portion, by preheating the film for coating and thermoforming the film for coating thereafter; and a process for injecting molten resin into a cavity within which the film for coating forming the three-dimensional shape and the outer circumferential bending portion therein is arranged so as to make the binder layer come into contact with molten resin.

In the manufacturing method of the film insert molded article of the present invention, printing is first performed on the raw material film so that the printing ink layer is formed, and the binder layer is formed on the printing ink layer.

Next, the raw material film is cut out and the film for coating is formed. The film for coating has a size for coating the coating plane of the film insert molded article, and also has a size able to form the outer circumferential bending portion arranged in the outer circumferential side portion of the coating plane of the film insert molded article by adding a width exceeding a heat shrinking amount of the film due to the thermoforming.

Next, after the film for coating is preheated, the film for coating is thermoformed so that the predetermined three-dimensional shape and the outer circumferential bending portion are formed. At this time, the film for coating is formed at a size exceeding the heat shrinking amount of the film due to the thermoforming and able to form the outer circumferential bending portion. Accordingly, even when the heat shrinking amount of the film becomes larger than a predicted heat shrinking amount by its dispersion, the film can be set to a size sufficient to coat the coating plane of the film insert molded article. The three-dimensional shape has a shape formed along the shape of the coating plane of the film insert molded article.

Next, the film for coating in which the three-dimensional shape and the outer circumferential bending portion are formed, is arranged within the cavity of the injection molding die such that the binder layer comes into contact with molten resin. The molten resin is then injected into the cavity. Thus, the molten resin filled within the cavity is cooled and solidified so that the injection-molded article of a shape formed along an shape of the inner plane of the cavity can be obtained. Further, since the binder layer is melted by heat of the molten resin and becomes an adhesive layer, the film for coating is molded integrally with the injection-molded article through the adhesive layer. As a result, it is possible to obtain the film insert molded article in which the coating plane is coated with the film for coating.

At this time, the film for coating has the outer circumferential bending portion and a size sufficient to coat the coating plane of the film insert molded article. Accordingly, it is possible to prevent a resin layer from being seen from the front of the coating plane. Further, since the film for coating has the outer circumferential bending portion, no excessive portion is generated in a portion for coating the coating plane when the film for coating is arranged within the die. Accordingly, it is possible to prevent a wrinkle from being generated in the film on the coating plane.

In the manufacturing method of the present invention, for example, a film made from polyethylene terephthalate resin can be used as the raw material film. When the raw material film is the film constructed by polyethylene terephthalate resin, the film for coating is preferably preheated at a temperature in a range of 150° C. to 190° C. When the preheating temperature is less than 150° C., there is a case in which the predetermined three-dimensional shape and the outer circumferential bending portion cannot be formed in the film for coating. Further, when the preheating temperature exceeds 190° C., there is a case in which the film for coating is damaged.

In accordance with study of the present inventors, the heat shrinkage due to the thermoforming of the film for coating lies within 1% of a maximum width of the film for coating, and variation in the heat shrinking amount lies within ±10% with respect to the heat shrinking amount. Therefore, in the manufacturing method of the present invention, the outer circumferential bending portion of the film for coating preferably has a width ($\alpha$) of 1.1% or more of the maximum width (L) of the coating plane. In accordance with such a construction, the outer circumferential bending portion arranged in the outer circumferential side portion of the coating plane can be formed in the film for coating after the thermoforming even when the heat shrinkage due to the thermoforming of the film for coating becomes the largest. Thus, it is possible to reliably prevent a resin layer from being seen in the front on the coating plane.

Further, in the manufacturing method of the present invention, the three-dimensional shape of the film for coating may include an emboss portion. When a switch member or the like is arranged below the emboss portion, the emboss portion becomes a pressing portion with respect to the switch member.

Further, in the manufacturing method of the present invention, when the three-dimensional shape of the film for coating includes the emboss portion, the injection molding die preferably has a shape in which a portion corresponding to the emboss portion of the film insert molded article becomes a through hole. In accordance with the injection molding die, it is possible to obtain the film insert molded article having the through hole in the portion corresponding to the emboss portion, and a switch member or the like operated by pressing the emboss portion can be arranged in the through hole.

BRIEF DESCRIPTION OF THE DRAWINGS

FIG. 7 is an explanatory sectional view showing the structure of the film for coating after the thermoforming in a modified example of the embodiment of the present invention;

FIG. 8 is an explanatory sectional view of a film insert molded article manufactured by a manufacturing method of the modified example of the embodiment of the present invention; and FIG. 9 is an explanatory sectional view showing the structure of an injection molding die in the modified example of the embodiment of the present invention.

DESCRIPTION OF THE PREFERRED EMBODIMENTS

An embodiment of the present invention will next be explained in further detail with reference to the accompanying drawings.

Figure 1:
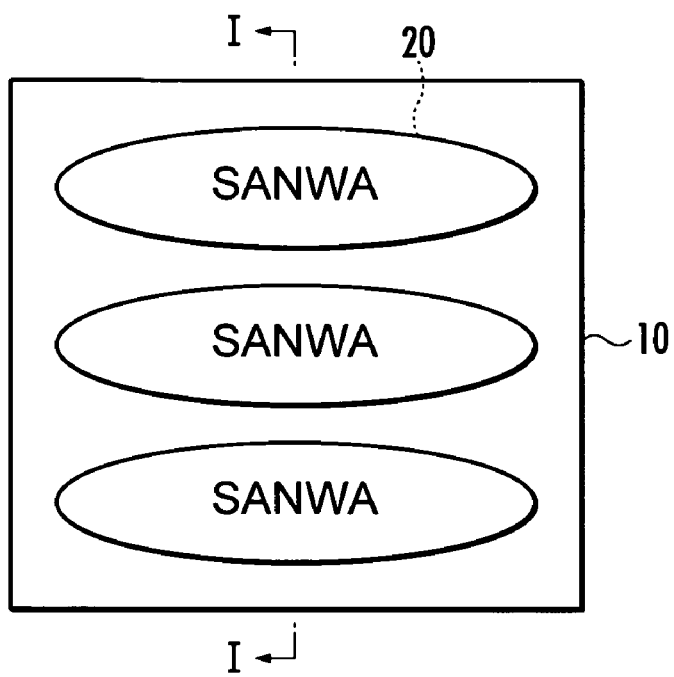
FIGS. 1(a) and 1(b) are a plan view and an explanatory sectional view showing the structure of a raw material film in an embodiment of the present invention.
Figure 1:
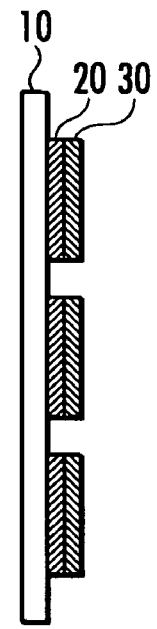

First, as shown in FIG. 1, printing is performed on the rear surface of a plastic film 10 as a raw material so that a printing ink layer 20 is formed. In the plastic film 10, multicavity moulding is normally performed and a plurality of printing ink layers 20 are formed at a predetermined interval on the rear face of the plastic film 10.

A film made from polyethylene terephthalate resin is preferably used as the plastic film 10 since it is excellent in aptitude with respect to printing, thermoforming property or the like. However, a film constructed by other resins such as polycarbonate resin or the like may be also used. The above printing can be performed by a silk screen method or an offset method. A color number of ink forming the printing ink layer 20 can be suitably determined by a design of the film insert molded article as a product.

Next, a binder is printed so as to be overlapped on the printing ink layer 20 so that a binder layer 30 is formed. The binder is an adhesive with respect to molding resin, and is dissolved by heat of molten resin in injection molding so that an adhesive layer is formed and adheres the printing ink layer 20 and an injection-molded article.

Figure 2:
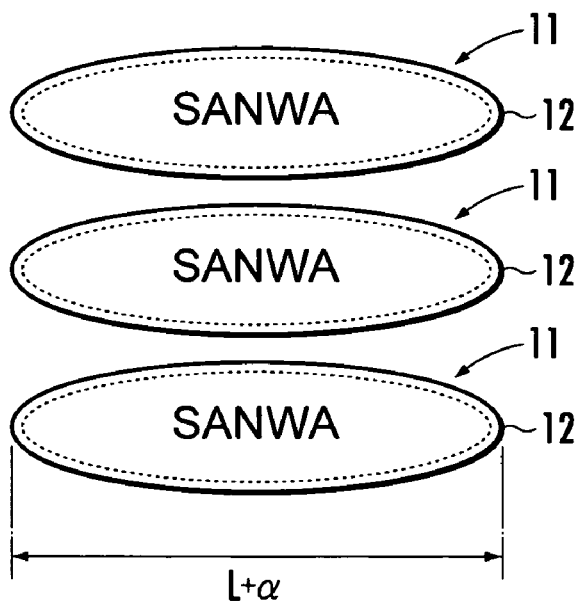
FIG. 2 is a plan view showing the structure of a film for coating in the embodiment of the present invention.

Next, the plastic film 10 is cut with respect to each printing ink layer 20, and a film 11 for coating shown in FIG. 2 is formed. For example, the plastic film 10 can be cut out by die cutting using a Thomson die or a press die.

At this time, the film 11 for coating has a size that coats the coating plane of the film insert molded article added with a width exceeding a heat shrinking amount due to thermoforming of the film 11 for coating. The film 11 for coating is cut out to a size able to form an outer circumferential bending portion 12 arranged in an outer circumferential side portion of the coating plane.

Specifically, the film 11 for coating has a heat shrinking amount of 1% by the thermoforming, and variation in the heat shrinking amount is +10% of the heat shrinking amount. Namely, the film 11 for coating shows heat shrinkage of 0.9 to 1.1% by the thermoforming.

Here, when a maximum width of the coating plane is set to L and a maximum width of the film 11 for coating is set to be equal to the maximum width of the coating plane, the maximum width of the film 11 for coating after the thermoforming becomes 0.989 L to 0.991 L and becomes smaller than L. Accordingly, a resin layer is seen from the front on the coating plane.

Therefore, in this embodiment, the film 11 for coating is formed at a size to which a width a of 1.1% or more of the maximum width L of the coating plane, which exceeds the heat shrinking amount, is added, i.e., at a size of L+$\alpha$. The heat shrinking amount in the thermoforming of the film 11 for coating is 1% (0.01 L), and dispersion ($\Delta$) of the heat shrinking amount is 10% of its maximum ($\Delta$=0.01 L×0.1=0.001 L) of the heat shrinking amount (0.01 L).

However, if the above width $\alpha$ is added, the film 11 for coating becomes a size in the range of 0.989 L+$\alpha$ to 0.991 L+$\alpha$ by the heat shrinkage. Further, since $\alpha$>1.1, the entire size becomes larger than L, and it is possible to prevent the resin layer from being seen from the front on the coating plane.

Next, the film 11 for coating is thermoformed. Specifically, the film 11 for coating is first preheated. In the case of a polyethylene terephthalate film, the temperature at this time is in a range of 150° C. to 190° C., and is preferably about 160° C. After the film 11 for coating is heated for several seconds, the film 11 for coating is set to a press die, and is pressed.

Figure 3:
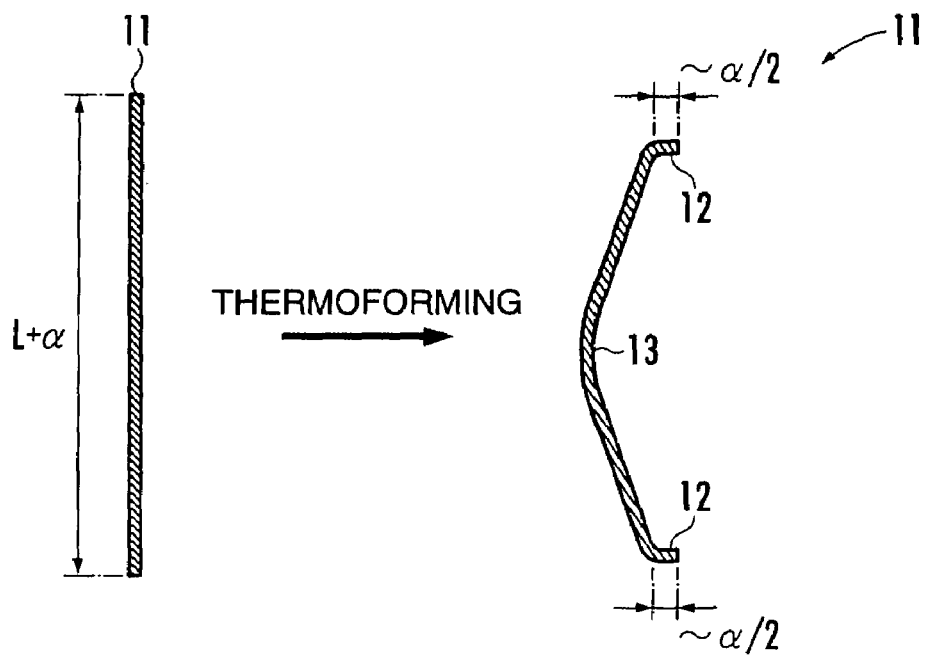
FIG. 3 is an explanatory sectional view showing the structure of the film for coating after thermoforming in the embodiment of the present invention.

As this result, as shown in FIG. 3, it is possible to obtain the film 11 for coating having a three-dimensional shape 13 and the outer circumferential bending portion 12. At this time, the film 11 for coating is thermally shrunk by the above preheat, but the film 11 for coating is set to the size of L+α as mentioned above. Accordingly, the three-dimensional shape 13 having the maximum width L of the coating plane is secured and the outer circumferential bending portion 12 of α/2 or less can be obtained.

The three-dimensional shape 13 is formed along the shape of the coating plane of the film insert molded article. It is possible to prevent the generation of a wrinkle on the coating plane of the film insert molded article by forming the three-dimensional shape 13 in advance.

Figure 4:
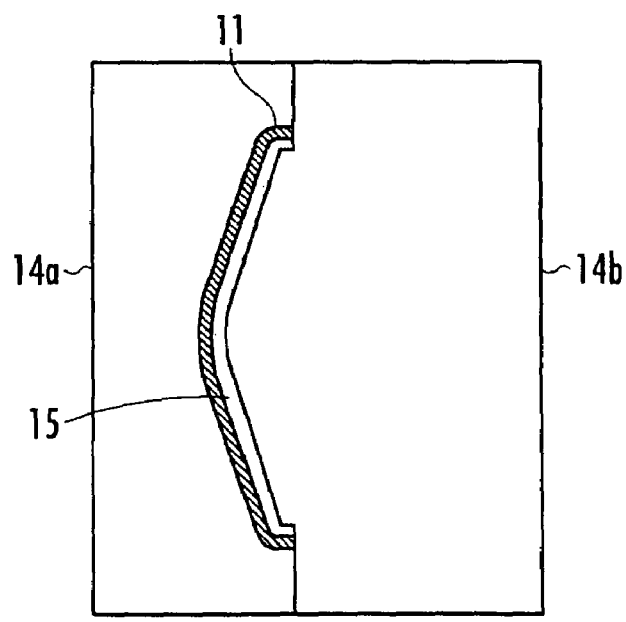
FIG. 4 is an explanatory sectional view showing the structure of an injection molding die in the embodiment of the present invention.

Next, as shown in FIG. 4, the film 11 for coating is arranged within a cavity 15 of an injection molding die 14*a*, and injection molding is performed by closing the injection molding die 14*a* by an injection molding die 14*b*. The film 11 for coating is arranged such that the binder layer 30 comes into contact with molten resin injected into the cavity. At this time, the film 11 for coating is automatically positioned since the three-dimensional shape 13 and the outer circumferential bending portion 12 are arranged along the shape of the inner plane of the cavity 15.

Figure 5:
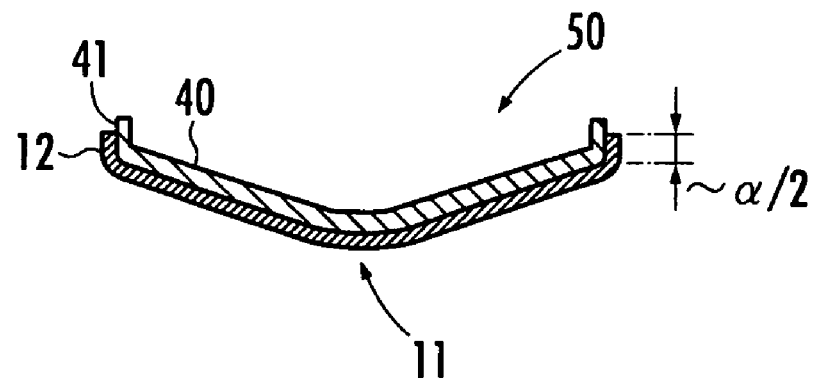
FIG. 5 is an explanatory sectional view of a film insert molded article manufactured by a manufacturing method of the embodiment of the present invention.

When the molten resin is injected into the cavity 15 by the injection molding, the molten resin filled within the cavity 15 is cooled and solidified. Thus, as shown in FIG. 5, an injection-molded article 40 of a shape formed along the shape of the inner plane of the cavity 15 can be obtained. Simultaneously, the binder layer 30 is melted by heat of the molten resin and becomes an adhesive layer, and the film 11 for coating is molded integrally with the injection-molded article 40 through the adhesive layer. Thus, it is possible to obtain a film insert molded article 50 in which the coating plane is coated with the film 11 for coating.

At this time, as shown in FIG. 5, in the film insert molded article 50, the outer circumferential bending portion 12 is arranged in an outer circumferential side portion 41 of the injection-molded article 40. Thus, even when a heat shrinking amount of the film 11 for coating is dispersed, this dispersion can be absorbed by the outer circumferential side portion 41. Namely, even when the dispersion becomes larger than predicted dispersion, only the outer circumferential bending portion 12 (α/2 or less) becomes small, and no resin layer is seen from the front on the coating plane. Conversely, when the dispersion becomes smaller than the predicted dispersion, only the outer circumferential bending portion 12 becomes large and extension or the like of the film 11 for coating can be restrained by the outer circumferential bending portion 12, and generation of a defect such as a wrinkle or the like on the coating plane can be prevented.

Figure 6:
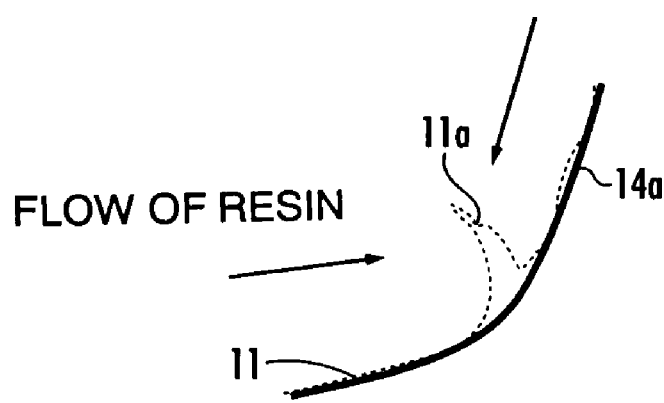
FIG. 6 is a view for explaining a mechanism of wrinkle generation when there is no outer circumferential bending portion.

In the case where there is no outer circumferential bending portion 12, as shown in FIG. 6, when the film 11 for coating is arranged within the cavity 15, the film 11 for coating is extended along an inner face of the injection molding die 14*a* in accordance with a flow of the molten resin. A wrinkle 11*a* is generated at a point where flows of resin flowing in various directions meet.

In the manufacturing method of this embodiment, as shown in FIG. 7, an emboss portion 13*a* may be also arranged as the three-dimensional shape 13 in the thermoforming of the film 11 for coating. When a switch member or the like is arranged below the emboss portion 13*a*, the emboss portion 13*a* becomes a pressing portion with respect to the switch member.

Therefore, when the film 11 for coating has the emboss portion 13*a*, as shown in FIG. 8, the film insert molded article 50 has a through hole 51 in which the switch member or the like is arranged, in a portion corresponding to the emboss portion 13*a* of the injection-molded article 40. Further, in this case, the film 11 for coating is set such that no binder layer 30 is arranged in a portion corresponding to the emboss portion 13*a* of the printing ink layer 20.

Further, when the film 11 for coating has the emboss portion 13*a*, as shown in FIG. 9, the injection molding die 14*b* has a convex portion 16 for forming the through hole 51 in the portion corresponding to the emboss portion 13*a*. In the injection molding die 14*b* shown in FIG. 9, a tip portion of the convex portion 16 is abutted against the emboss portion 13*a*, and a portion having no convex portion 16 is set to the cavity 15.

What is claimed is:

1. A manufacturing method of a film insert molded article, comprising steps of:
    printing on a film to form a printing ink layer;
    printing a binder layer on the printing ink layer to form a binder layer;
    performing a die-cut on the film by cutting the film after adding an outer circumferential bending amount (a) to the film to be subjected to the die-cut in a manner that an outer circumferential side surface of a product is enwrapped with the film;
    performing a forming process in which circumferential bending and 3-dimensional shaping are performed via press-molding after pre-heating the film subjected to the die-cut; and
    injecting molten resin into an injection molding die after the film subjected to the forming process is set on a cavity surface of the injection molding die to melt the binder layer into an adhesive agent to adhere the ink layer and a molded resin layer so as to enwrap the film on the outer circumferential side surface of the product with the film,
    wherein the circumferential bending amount (a) is set greater than a variation (A) of a thermal shrinkage amount of the film caused by pre-heating the film in the forming process.

2. The manufacturing method of a film insert molded article according to claim 1, wherein the film is a PET film; and the film subjected to the die-cut is pre-heated in the forming process at a temperature ranging from 150° C. to 190° C.

3. The manufacturing method of a film insert molded article according to claim 2, wherein the outer circumferential bending amount (a) is added to a longitudinal dimension (L) of the film to be subjected to the die-cut on the basis of a standard that the thermal shrinkage amount is 1% of the longitudinal dimension (L) of the film subjected to the die-cut and the variation (Lx) of the thermal shrinkage amount is 10% of the thermal shrinkage amount.

4. The manufacturing method of a film insert molded article according to claim 2, wherein the outer circumferential bending amount (a) is equal or greater than 0.5 mm.

5. The manufacturing method of a film insert molded article according to claim 1, wherein the 3-dimensional shaping includes forming an embossment portion; and a portion of the molded resin layer corresponded to the embossment portion is formed into a penetrated hole in the injection molding die.

6. The manufacturing method of a film insert molded article according to claim 2, wherein the 3-dimensional shaping includes forming an embossment portion; and a portion of the molded resin layer corresponded to the embossment portion is formed into a penetrated hole in the injection molding die.

7. The manufacturing method of a film insert molded article according to claim 3, wherein the 3-dimensional shaping includes forming an embossment portion; and a portion of the molded resin layer corresponded to the embossment portion is formed into a penetrated hole in the injection molding die.

8. The manufacturing method of a film insert molded article according to claim 4, wherein the 3-dimensional shaping includes forming an embossment portion; and a portion of the molded resin layer corresponded to the embossment portion is formed into a penetrated hole in the injection molding die.

* * * * *